United States Patent [19]
Klein et al.

[11] Patent Number: 4,960,402
[45] Date of Patent: Oct. 2, 1990

[54] ANTI-CHAIN WRAP DEVICE FOR BICYCLES

[75] Inventors: Gary G. Klein, Chehalis, Wash.; Tye T. Gribb, Madison, Wis.

[73] Assignee: Klein Bicycle Corporation, Chehalis, Wash.

[21] Appl. No.: 412,823

[22] Filed: Sep. 27, 1989

[51] Int. Cl.⁵ ............................................. F16H 7/18
[52] U.S. Cl. .................................... 474/80; 474/101; 474/140
[58] Field of Search ..................................... 474/77–82, 474/101, 119, 140, 144–147, 152–153; 74/608, 609; 180/84; 280/847, 159, 160

[56] References Cited

U.S. PATENT DOCUMENTS

| | | | |
|---|---|---|---|
| 4,215,872 | 8/1980 | Clark | 474/80 X |
| 4,674,995 | 6/1987 | Iwasaki | 474/80 |
| 4,894,046 | 1/1990 | Browning | 474/80 X |

*Primary Examiner*—Thuy M. Bui
*Attorney, Agent, or Firm*—Jim Zegeer

[57] ABSTRACT

An anti-chain wrap device has a plurality of lifters which are raised and curved to be adjacent the rotary path of the chainrings, respectively, to strip or free a struck chain from the chainring. The lifters are finger blade members which are joined near their lower ends to provide a more rigid construction.

20 Claims, 4 Drawing Sheets

ANTI-CHAIN WRAP DEVICE FOR BICYCLES

BACKGROUND AND BRIEF DESCRIPTION OF THE INVENTION

With the recent development of bicycles designed to be ridden off-road ("mountain bikes"), a jamming problem has emerged in the bicycle chain drive. The problem, sometimes referred to as chain-suck or chain-wrap, henceforth referred to herein as chain-wrap, involves the interaction of the drive chain and the front chainrings (the front toothed sprockets attached to the crank pedal arms and rotatably mounted in the bottom bracket).

For various reasons, discussed below, the chain will fail to release from the chainring at the appropriate point. The chain is carried until it is either pulled off by the spring tension of the derailleur or jammed between the chainring and the chainstay or chainstay mounted brake.

The problem of chain-wrap is not unique to mountain bikes, but the conditions in which the bikes are ridden and their design accentuates the problem over that of bikes designed for conventional road use.

Unlike most road bikes which have two, mountain bikes are generally fitted with three coaxial chainrings or sprocket wheels. The smallest being in the range of 24-28 teeth, the middle 34-38 teeth, and the largest 44-52 teeth.

There are two different modes of chain-wrap. The most common mode occurs when shifting between two chainrings, generally from the middle to the smallest chainring of vice versa. The chain is shifted from one chainring to the other by means of the front derailleur. For a period of time, the chain is partially on both chainrings. As the chain has limited lateral flexibility, this causes the chain to press up tightly to the chainrings which may cause the chain to stick or bind.

Chain wrap is also known to occur without shifting usually while in the middle or small chainring. Often rough terrain is involved.

There are many variables which alone or working with others seem to increase the occurrence of chain-wrap. A partial list includes the following:

(1) Dirty or unlubricated chain. As these bikes are often ridden in extremely muddy or dusty conditions, this is frequently the case.

(2) Poor chain line. Chain line refers to the positioning of the chainrings with respect to the gears in back. A poor chain line increases the lateral stress on the chain, increasing the likelihood of chain-wrap.

(3) Riding over bumpy terrain. Bumpy terrain tends to cause chain to move considerably. The lower section may momentarily bounce higher facilitating chain-wrap.

(4) Differences in equipment. Smaller chainrings result in more chain slack which must be taken up by the rear derailleur resulting in lower chain tension. There are also noticeable differences in frequency of chain-wrap between different brands of chains and chainrings, but all brands exhibit chain-wrap in use.

(5) Worn equipment. As the chainrings wear, grooves are worn into the leading edge of the individual teeth resulting in hooked teeth which may prevent proper chain release. Wear is relatively rapid due to the dirty conditions of use.

(6) Shifting under unusually high pressures. Typical mountain bike terrain varies rapidly. Consequently, a shift is often initiated "late" (under heavy pedal pressure). The added pressure on the chain makes it less likely to release.

The damage caused by chain-wrap is variable. Generally the chain is jammed and must be forced out by back pedalling, or in extreme cases, removed with a tool. The chain, chainrings, frame and rear derailleur may be damaged. If chain-wrap occurs frequently, significant wear can occur on the chainstay where the chain wedges between it and the chainring.

Several steps can be and have been used to reduce the occurrence of chain-wrap. Simple measures such as proper bike adjustment, lubrication and proper riding style can significantly reduce the severity of chain-wrap.

The bicycle industry has responded with a few solutions. Shimano Corporation has a device called a Shark-tooth®. This is a piece of plastic attached to a brake that is mounted under the chainstays in an attempt to eliminate chain-wrap. The device guides the chain stuck to the chainrings so as to hit the brake squarely and not to slip off to the side. On some occasions this is enough to dislodge the chain but usually the chain stays on the chainrings, travels under the brake and still wedges into the space between the chainrings and chainstay. The industry, as a whole, is phasing out under-the-chainstay brakes. Another device mounted under the rear chainstay-mounted brake resembles a miniature guard rail protecting the brake from chain hits, but without apparent success at eliminating the chain wrap. A custom builder provided a flat plate mounted to the underside of his rear brake calipers, which the consumer was instructed to hacksaw and file into shape to fit the chainrings. When mounted on a typical bike, however, the plate only came close to the largest chainring, providing no benefit for the common occurrence of chain wrap in the middle and small chainrings. In fact, the plate is positioned so low as to interfere with the normal operation of the chain on the small chainring. The mounting holes are drilled slightly larger than the fastening bolts, allowing a small amount of adjustment of the resulting plate, but not enough to fit a variety of cranksets. This type of flat plate design appears to have chain interference and fit problems with normal bicycles.

Another response or solution has been to raise the chainstays to a positions above the chainrings. In this case the chain will not hit the raised chainstay but will wrap all the way around to become caught under the chain feeding onto the chainring through the front derailleur (on top). If the rider does not catch the problem immediately and continues pedalling, the rear derailleur runs out of tension adjustment and is damaged or pulled out of the frame.

Other disadvantages of raising the chainstays are structural. The bicycle receives its strength and rigidity from the "double triangle" formed in a typical frame. The tension in the driving chain is counteracted by compression in predominately the right chainstay, see my U.S. Pat. No. 4,621,827. As the two loading pounds are the bottom bracket assembly and the rear dropout, the chainstay, which goes almost straight between them, is most effective in resisting the forces and keeping deflection to a minimum. By raising the chainstays this advantage is lost requiring added reinforcement tubes in the frame and heavier tubing. Consequently, frames using raised chainstays are less rigid and heavier than a standard frame.

The object of this invention is to provide an anti-chain-wrap device to solve the afore mentioned problem, and more particularly, to provide an anti-chain wrap device which lifts the chain from the chainring teeth in the event that it has failed to release properly on its own.

The invention is applicable to a bicycle with the following characteristics:

(1) A chain drive system including rear sprockets to drive the rear wheel.

(2) A rear derailleur which maintains chain tension by means of a spring tensioned arm.

Bikes of this type experience an occasional failure of the chain to release the front chainring at the proper point (chain-wrap). This can lead to chain jamming and possible damage to components and the bike frame. The problem is magnified by smaller chainrings and dirtier conditions.

The anti-chain wrap device of the invention which is attached to the frame may also be called a chain-wrap prevention device. In its preferred embodiment it is bolted to the underside of the chainstay and has multiple "lifters", three "lifters" in the case of a three chainring front drive assembly, one for each chainring. The lifters are situated so that they are in close proximity to the chainrings. Some popular chainrings on the market are not round, but are elliptical or even more complex (Biopace). Trying to cause the chain to release by positioning a device such as a flat plate on the outside edge of the chainring occasionally allows the chain to jam even when the end of the tooth is in close proximity to the device using round chainrings, and when using the not round chainrings, during part of the revolution of the crank there will be a large gap between a device and the teeth, allowing the chain to easily jam. At the point at which the chain hits the plate, the chain was nearly at a right angle to the plate. Instead of freeing the chain from the chainring, the plate occasionally jammed the chain into the chainring solidly resulting in damage to both.

Preferably, the lifters are positioned to the side and raise the teeth for the two smaller rings so that they intersect the chainrings where the chain angle is low relative to the lifters. To dislodge a chain at a lower angle requires much less force. The lifters at this height easily lift the chain out of the chainring teeth. In the preferred embodiment, the lifters are larger than would be necessary for any one set of chainrings so as to accommodate a wide range of chainring sizes.

In its preferred embodiment, the anti-chain wrap device is a stamping out of 0.01 inch to 0.125 inch aluminum plate. The device has a flat area with three slotted bolt holes. The slotted holes adjustment of the device to fit different chainring and frame configurations and allows limited front to back movement, and substantial side-to-side and angular adjustment. Also optionally incorporated into the device is a cable guide for the rear derailleur and thus aids in installation of the device on a bicycle. The lifters for the middle and smallest chainring curve up and out of the flat part. Preferably, the lower half of the two raised lifters are connected for increased strength and rigidity. The curve in each lifter is sufficient to keep all but the top part clear of the chainrings. The lifter for the smallest chainring is as high as possible without hitting the chain in normal operation. The lifter for the middle chainring is lower to avoid the possibility of the chain jamming between the two lifters. The lifter for the large chainring is the shortest, but may be part of the flat mounting plate. The device is inexpensive and designed to be easily replaceable if the need should arise.

BRIEF DESCRIPTION OF THE DRAWINGS

The above and other objects, advantages and features of the invention will become more apparent when considered with the following description and accompanying drawings wherein.

DETAILED DESCRIPTION OF THE INVENTION

Figure 1:
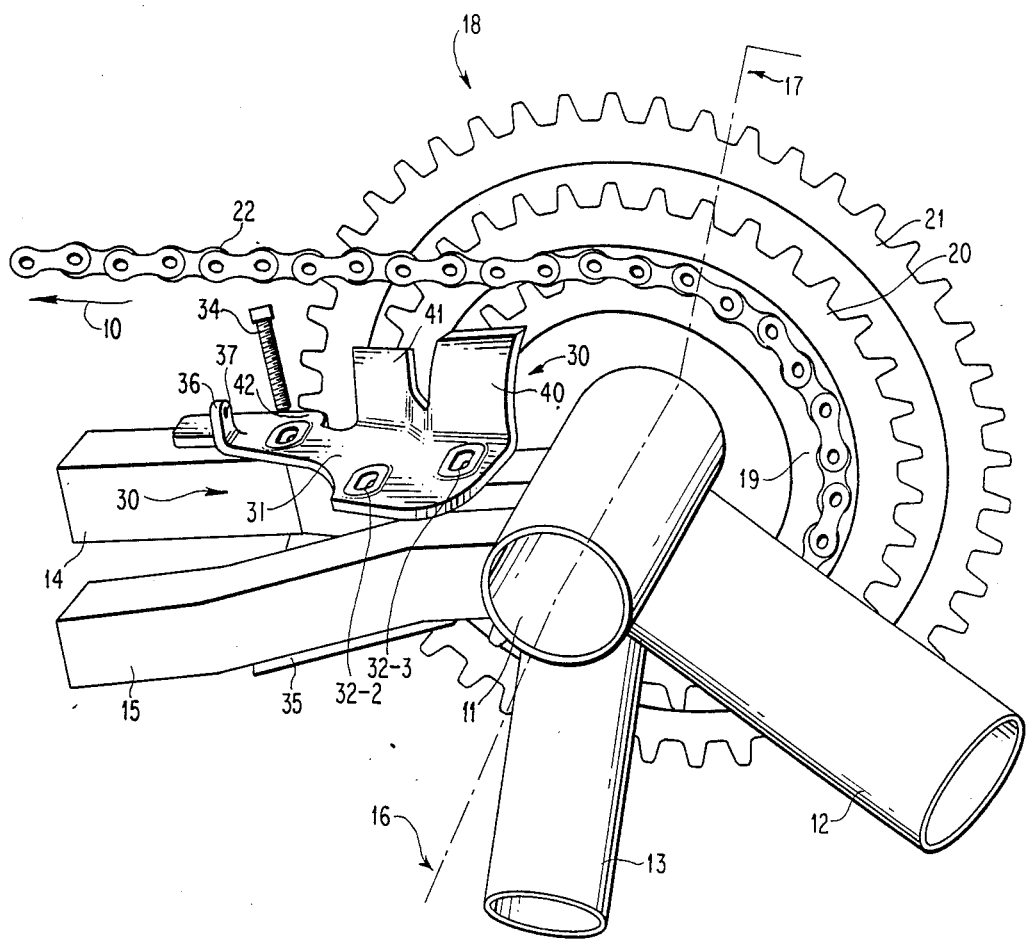
FIG. 1 is an isometric perspective view of an anti-chain wrap device for bicycles incorporating the invention, the view being of an upside-down view of a bicycle to which it has been applied.
Figure 2:
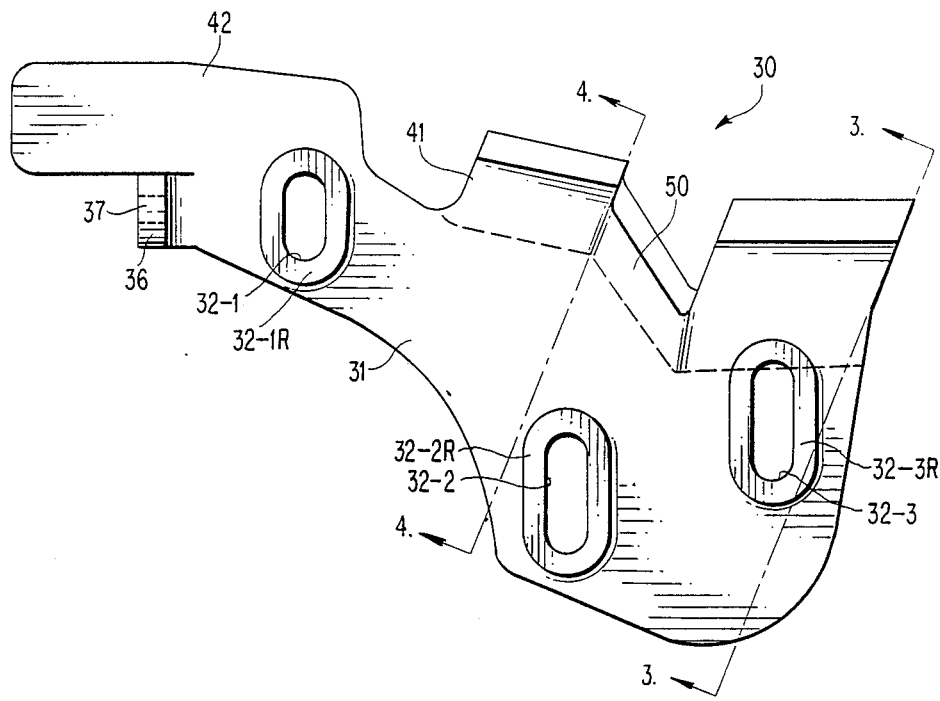
FIG. 2 is a plan view of an anti-chain wrap device incorporating the invention.

The invention is applicable to a bicycle having a chain drive system including a rear drive sprocket coupled to drive the rear wheel and a rear derailleur, which includes a spring tensioned arm for maintaining chain tension. In FIG. 1, the rear sprocket and rear derailleur including the spring loaded tensioned arm are indicated diagrammatically by the arrow 10. A portion of the bicycle frame is illustrated including the bottom bracket 11, down tube 12, seat tube 13 and a pair of chainstays 14 and 15 secured to bottom bracket 11. Left and right crank arm and pedals 16 and 17 are diagrammatically illustrated by dashed lines so they do not obstruct illustration of the anti-chain wrap device of this invention. The front drive sprocket or chainring assembly 18 includes three chain rings 19, 20 and 21 which are of various diameters (as noted above, for example, the smallest being adapted to accommodate the number of teeth in a range of 24–28 teeth, ring 20 being adapted to accommodate 34–38 teeth, and the larger chainring 21 being designed to accommodate 44–52 teeth depending on gear ranges desired). Sprocket chain 22 is chained around chainring 19, a rear drive sprocket and the tension therein is maintained by the rear derailleur which includes a spring tensioned arm and idler wheel indicated by the arrow 10. A front derailleur, diagrammatically illustrated by FD, shifts the chain from chainring to chainring.

THE ANTI-CHAIN WRAP DEVICE OF THIS INVENTION

The anti-chain wrap device of this invention is shown as an integral one-piece element 30 and, in a preferred embodiment, is produced from 7178 aluminum 0.1 inch thick. Anti-chain wrap device 30 includes a flat mounting plate 31 having bolt holes 32-1, 32-2 and 32-3 through which pass mounting bolts 34 (there being one mounting bolt for each hole), which are threadably engaged with a clamp plate 35 on the opposite side of the forward ends of chainstays 14 and 15. Mounting holes 32-1, 32-2 and 32-3 are oblong so as to permit easy adjustment of the positions of the device relative to the chainring assembly 18.

A down turned (shown as upturned in the upside down view of FIG. 1) finger 36 is provided with a threaded hole 37 to serve as a control cable guide and can aid in installation and alignment of the device. Each of the mounting holes has an embossed or raised perimeter 32-1R, 32-2R and 32-3R and corresponding recesses formed from the pressing out of these elements in the base of plate 31.

Figure 3:
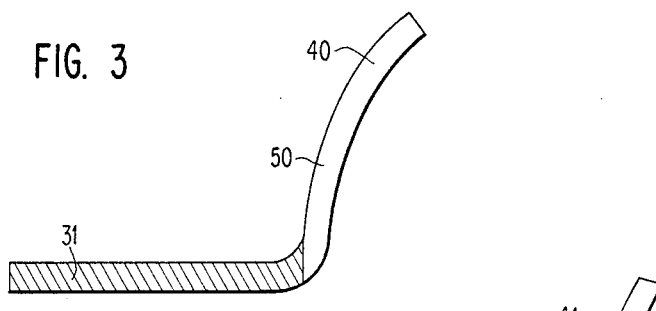
FIG. 3 is a sectional view taken on lines 3—3 of FIG. 2.
Figure 4:
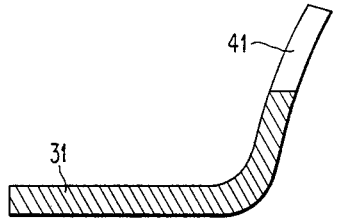
FIG. 4 is a sectional view taken on lines 4—4 of FIG. 2.
Figure 5:
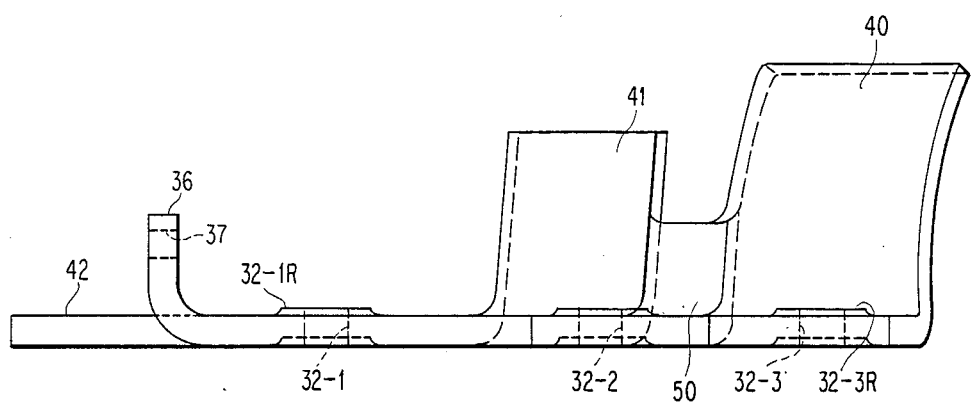
FIG. 5 is an end view of the anti-chain wrap device of this invention.
Figure 6:
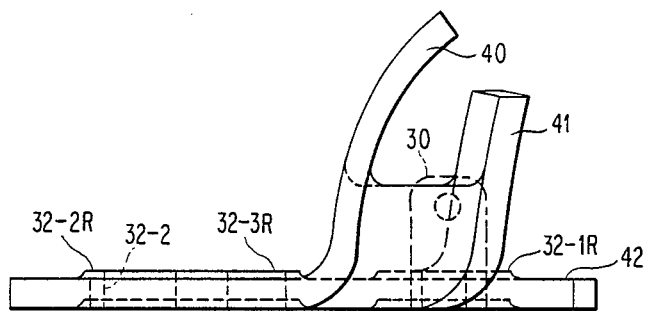
FIG. 6 is a side view of the anti-chain wrap device of this invention.

In the anti-chain wrap device shown in the drawings, there are three "lifters" 40, 41, and 42, one for each chainring 19, 20 and 21, respectively. Lifters 40 and 41 have sectional views taken along the curve of the tooth profile which is consistent along the entire tooth, as is illustrated in FIG. 3 for lifter 40 and FIG. 4 for tooth 41 in FIGS. 3 and 4, respectively. Lifters or teeth 40 and 41 are curved so as to position them adjacent the side of the rotary path of chainrings 19 and 20, respectively, and raise the chain for the teeth for the two smaller rings so that they intersect the chainrings where the chain angle is low relative to the lifters. This permits the dislodgement of the chain at lower angles which requires much less force.

The lifters at these respective heights easily lift the chain out of the chainring teeth. Moreover, the lifters 40, 41 and 42 are larger than would be necessary for any one set of chainrings so that they can be used to accommodate a wide range of chainring sizes. As illustrated, lifters 40 and 41 curve up and out of the first part or mounting base 31 and, it will be noted that a metal connector 50 connects the lower half of the two raised lifters 40 and 41 to increase the strength and rigidity. Moreover, the curve of lifters 40 and 41 is sufficient to keep all but the top part clear of the chainrings. Lifter 40 for the smallest chainring 19 is as high as possible without hitting the chain 22 in normal operation. Lifter 41 is lower to avoid the possibility of chain 22 jamming between the two lifters. Lifter 42 for the large chainring 21 is part of the flat base 31.

Figure 7A:
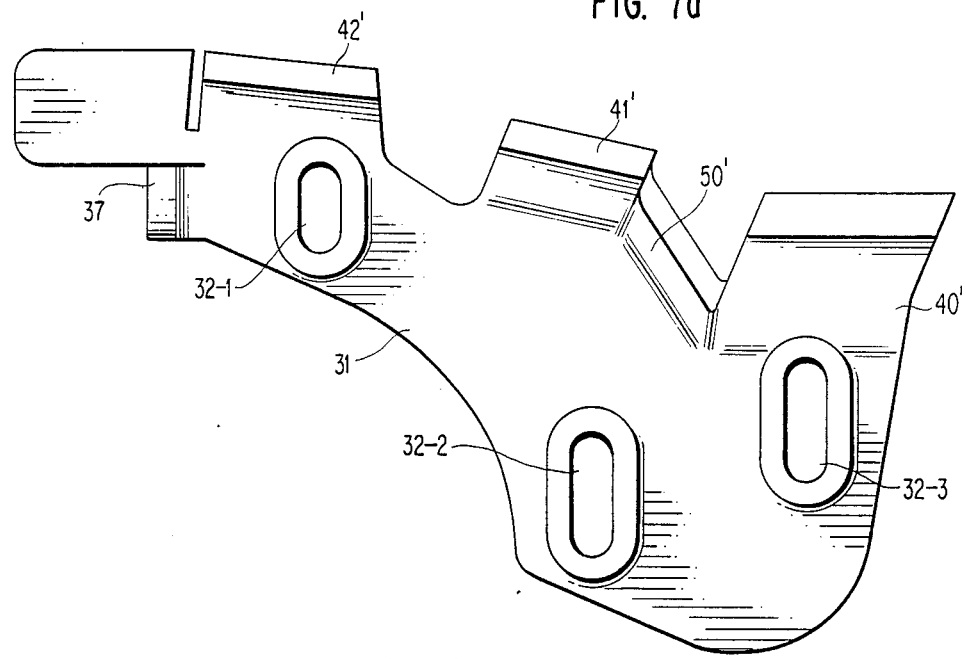
FIGS. 7a, 7b and 7c illustrate a further preferred embodiment of the invention.
Figure 7B:
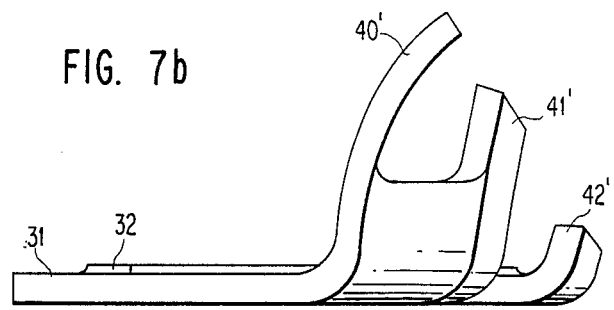
Figure 7C:
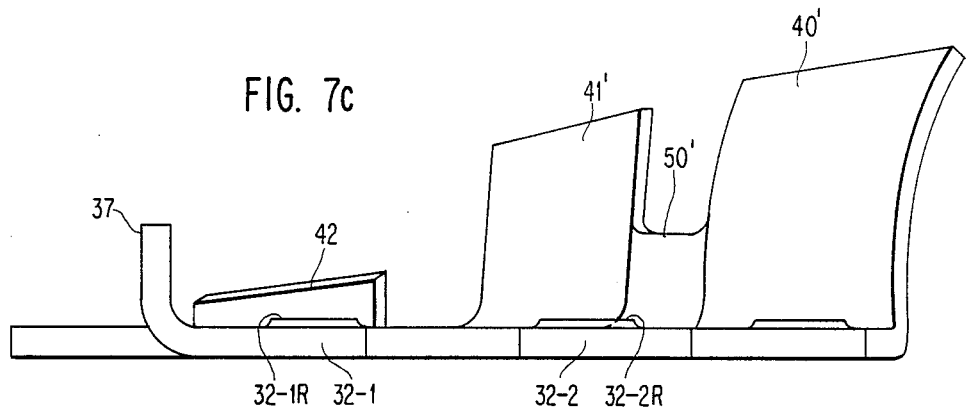

FIG. 7a is a top view of a preferred embodiment of the invention, and FIGS. 7b and 7c are right and front views, respectively, of the device shown in FIG. 7a. Like or corresponding parts have been primed. In this preferred embodiment, the lifter for the largest chainring (chainring 21 in FIG. 1), is turned out of the plane of the body plate member 31'.

The anti-chain wrap device of this invention has the following advantages and distinguishing characteristics:

(1) The device is on piece single, preferably light weight metal or plastic, that is bolted very close to the sides of the chainrings. Unlike the raised chainstay bicycles of other manufacturers, the device requires no radical design changes to the bicycle that may compromise the bike's structural integrity.

(2) The device has a lifter for each chainring. For a mountain bike, for example, which usually has three chainrings, there are three lifters. They lift the chain from the chainring when the chain has failed to release at the proper point. This characteristic distinguishes it from such devices as the Shimano Sharktooth. The Shimano Sharktooth is located at a distance from the chainrings and has only one protrusion to stop the chain from jamming. The lifters are raised to where they intersect the wrapping chain very close to the proper release point. By raising the lifters to this point, the force required to lift the chain off is much less than when the chain-wrap has progressed.

(3) In the preferred embodiment, the lifters are ramped relative to the chain. This insures that the chain will be lifted off the chainring and not jam into the device. This feature also reduces wear and increases life of the device.

(4) The anti-chain wrap device of this invention is adjustable, further distinguishing it from the prior art. The slotted bolt holes and elongated or large lifters allow extensive adjustment both forward and back and laterally with respect to the chainrings. This allows the device to accommodate different sizes of chainrings, varying shape of chainrings, different bottom bracket sizes, different chainstays, and varying spindle lengths (axle for the cranks).

(5) The anti-chain wrap device of this invention may also incorporate or include a cable guide. This guide keeps the rear derailleur cable clear of the tire, the device itself, and the chainrings.

While there has been shown and described a preferred embodiment of the invention, it will be appreciated that various modifications and adaptations thereof will be apparent to those skilled in the art and be with the scope of the invention. It is intended therefore that the disclosure hereof shall be read as illustrative.

What is claimed is:

1. An anti-chain wrap device for a chainring drive system of a bicycle in which there are a plurality of chainrings of varying diameters and teeth rotatably mounted in the bottom bracket of said bicycle, a set of rear sprocket wheels mounted on the rear wheel, one of a pair of chainstays extending rearwardly of said bottom bracket, and a rear derailleur having a tension arm for maintaining chain tension, comprising means for mounting said anti-chain wrap device on said bicycle adjacent the rotary path of said chainrings, and a plurality of lifters, there being a lifter for each chainring and the lifters for the smaller of said chainrings extending in a downward curved direction to a point adjacent the rotary path of its associated chainring, respectively.

2. The anti-chain wrap device of claim 1 wherein said device is made of aluminum and each of said lifters is shaped and has a length to be positioned adjacent an upward path of rotary travel of each said chainring, respectively.

3. The invention defined in claim 2 including a cable guide means integral with said device.

4. The invention defined in claim 1 including threaded fastener means for mounting said device on a bicycle, and wherein said device includes elongated holes through which said threaded fasteners pass to permit adjustment of said device relative to the paths of said chainrings.

5. The invention defined in claim 1 wherein each lifter has a length such that the device can be used on a wide variety of bicycles.

6. The invention defined in claim 1 wherein each said lifter is ramped relative to said chain.

7. The invention defined in claim 1 wherein said lifters are raised to where they intersect the wrapping chain close to the proper release point so that the force required to lift the chain off of the chainring is much less than when chain-wrap has progressed.

8. The invention defined in claim 1 wherein said lifters comprise finger blades which are joined near their lower ends to rigidify said finger blades.

9. The invention defined in claim 8 including an adjustable clamp means whereby the lateral position of the lifters and the angle of the lifters can be adjusted to be in close proximity to the front sprocket or sprockets.

10. The invention defined in claim 9 in which said mechanism is attached or fastened to the bottom most surface of the chainstays.

11. The invention defined in claim 10 including a device for positioning the rear derailleur cable.

12. The device defined in claim 11 wherein the individual lifters are placed at different horizontal levels.

13. The device defined in claim 12 wherein the device is formed from a plate material.

14. The invention defined in claim 10 wherein said mechanism is made of shaped plate material.

15. The invention defined in claim 9 including a device for positioning the rear derailleur cable.

16. The invention defined in claim 9 wherein the individual lifters are placed at different horizontal levels.

17. On a bicycle of the type with a chain drive system including a rear derailleur including a spring chain tensioning device, rear sprocket or sprockets drivingly connected to the rear wheel, two or more front sprockets drivingly connected to one or more rear sprockets by a chain, a front derailleur mechanism, cranks and pedals drivingly connected to the front sprockets, a frame to which the working parts of the bicycle are attached, including a bottom bracket, containing bearings to hold said rotating crank and sprocket assembly, two chainstays, or other supporting means of connecting to the bottom bracket at one end and two rear dropouts, holding the rear wheel axle and connecting to the rear ends of the two chainstays or other supporting means at the other end, the improvement comprising a mechanism attached to the bicycle frame positioned behind the bottom bracket in close proximity to said front sprockets, along the side of the sprockets in the area of the sprocket teeth, a plurality of lifters, one for each front sprocket, each lifter being positioned at an angle and extending downwardly such that as a stuck chain is carried around the front sprocket it is on, beyond where it should have released due to gravity and derailleur tension, the lifters contacts the chain and lifts it away from the sprocket teeth as the sprocket rotates in the normal forward direction.

18. The invention defined in claim 17 including a device for positioning the rear derailleur cable.

19. The invention defined in claim 17 in which the mechanism is attached or fastened to the bottom most surface of the chainstays.

20. The defined defined in claim 17 wherein the individual lifters are placed at different horizontal levels.

* * * * *